Patented July 18, 1944

2,353,869

UNITED STATES PATENT OFFICE 2,353,869

DEFEATHERING COMPOUND

Oscar T. Bloom, Chicago, Ill., assignor to Industrial Patents Corporation, Chicago, Ill., a corporation of Delaware No Drawing. Application April 16, 1942,
Serial No. 439,231

26 Claims. (Cl. 17—45)

This invention relates to the depilating of animal carcasses and has to do more particularly with a method of defeathering carcasses of fowls and with an improved composition for applying to the surface of poultry carcasses to form a removable coating to which the feathers adhere.

It has been known heretofore that a molten congealable composition may be applied to the surface of animals to form a coating surrounding the hair or feathers. The coating is allowed to cool and solidify, and thereafter the coating is removed, whereby the hair or feathers are firmly embedded in the coating and are pulled from the skin.

Various waxy compositions have been proposed heretofore for use as defeathering compounds but all of these have had certain disadvantages. For example, it is often necessary to dip or coat the carcass several times with the compound to produce a coating of the required thickness. Also the coating often drips unduly from the carcass, causing delay in draining and necessitating provision for recovering the drippings. Moreover, the compounds have melting-point characteristics which require spraying of the dipped carcasses with water to solidify the compound and to provide a coating of the necessary thickness.

An object of the present invention is to provide a method of defeathering poultry whereby only one application of the coating composition is required.

Another object of the invention is to provide a defeathering compound which will not drip after the carcass is dipped in the compound.

Another object of the invention is to prepare a defeathering composition which has a sharp melting point and has quick setting properties.

Another object of the invention is to produce a defeathering compound which solidifies near the dipping temperature.

A further object of the invention is to provide a method of defeathering poultry by a defeathering compound which solidifies quickly on exposure and requires no water cooling.

In the defeathering of poultry it is customary to kill the bird and attach the carcass to a conveyor. After bleeding, the carcass is scalded and the major portion of the feathers removed by hand or mechanical pickers. The picked carcass containing hair, pin feathers, etc., is dipped in a molten defeathering compound. Due to the viscosity characteristics of the compounds used heretofore more than one dipping is usually required to produce a coat of the required thickness. Also, due to the melting point characteristics of prior compounds, it is usually necessary to spray the dipped carcass with water to solidify the coating and to avoid excessive draining. In continuous operations and in spite of water cooling, loss and smearing of the defeathering compound occur due to dripping. The coating composition is finally peeled from the carcass, whereby the hair and fine feathers are removed to produce a clean surface.

It has been found that only one dip of the carcass is necessary to produce a coating of the desired thickness and that dripping can be avoided providing the proper type of composition is used. I have discovered that a waxy composition having the proper melting point and viscosity characteristics to produce the desired results may be obtained by mixing suitable ingredients as disclosed below in the proper proportions.

The defeathering composition of the present invention comprises mainly rosin and a petroleum wax. I prefer to use high tensile strength paraffin wax of about 125° to 130° F. M. P., although other petroleum waxes of crystalline or amorphous character may be used alone or in mixture with the paraffin. The rosin may be commercial rosin obtained from pine trees, sawdust, etc. The latter rosin tends to crystallize quite strongly and it is often desirable to use a small amount, say 1½ to 3½ per cent based on the mixture or about 5 per cent based on the rosin, of gum dammar to suppress the crystallization. Instead of commercial rosin, I have found a refined gum rosin, known in the trade as "nelio gum" to be very satisfactory. This type of gum rosin is prepared out of contact with air and probably contains less oxidation products than ordinary rosin, whereby the tendency to crystallize is less and the use of a crystallization inhibitor, such as gum dammar, is often unnecessary. The rosin ingredient imparts stickiness or tackiness to the mixture. The paraffin gives a leathery toughness which is useful in pulling the coating from the carcass. The rosin and paraffin ingredients may comprise about 90 to 95 per cent of the defeathering compound, for example, the amount of rosin may constitute about 35 to 45 per cent and the paraffin about 60 to 50 per cent, the remainder being ingredients which will be described hereinafter.

It is desirable to add to the above mixture a small amount of carnauba and/or candelilla waxes. The candelilla wax increases the viscosity and gives more body to the composition without raising the melting point too high. The carnauba wax has some of the same advantages of candelilla wax but is particularly useful for imparting to the mixture quick setting properties. Instead of carnauba wax, any equivalent material may be used. In some cases, the carnauba wax may be omitted entirely. Usually about 1 to 5 per cent of candelilla wax and about 0 to 3 per cent of carnauba wax by weight based on the entire mixture is satisfactory. Instead of candelilla and carnauba, other waxes having equivalent properties may be used.

It is also desirable to add to the wax mixture a small amount of a water insoluble soap of a metal having a valence greater than one. I have found soaps of amphoteric metals, such as aluminum stearate to be preferable, although soaps of other metals such as calcium, barium, strontium, magnesium and iron may be used. Soaps of higher fatty acids, such as found in natural fats and oils, containing twelve or more carbon atoms are desirable. The amount of the soap may be about 1 to 3 per cent based on the entire composition. The soap sharpens the melting point, increases the toughness and improves the mixing of the ingredients of the mixture. It also affects the viscosity characteristics and aids in depositing a heavier coat on the carcass. Furthermore, the soap has an important function of suppressing the tendency of the waxes, particularly the condelilla and carnauba, to crystallize or grain out of the composition.

In the preparation of the defeathering compound the rosin and modifying agent, if any, such as gum dammar, are melted and the desired amount of carnauba and candelilla waxes are added to the clear melt. The paraffin is melted separately and the aluminum stearate is added thereto. The paraffin and aluminum stearate mixture is then added to the rosin mixture.

For purposes of illustration only, a preferred formula is given below:

| | Pounds |
|---|---|
| Rosin | [1] 38 |
| Gum dammar | [1] 2 |
| Paraffin wax, 125°–127° F. M | 58 |
| Aluminum stearate | 2 |
| Candelilla wax | 3 |
| Carnauba wax | 2 |

[1] May be substituted by 40 pounds of refined gum rosin.

In the above formula the ingredients may be used in amounts within about the following ranges:

| | Pounds |
|---|---|
| Rosin | [1] 35–45 |
| Gum dammar | [1] 1½–3½ |
| Paraffin wax | 50–60 |
| Aluminum stearate | 1–3 |
| Candelilla wax | 1–5 |
| Carnauba wax | 0–3 |

[1] May be substituted by 35–45 pounds of refined gum rosin.

As an example of the operation of the invention, forty pounds of "nelio gum" rosin was melted to a clear liquid and the temperature adjusted to about 240° F. In a separate tank 58 pounds of paraffin was melted and 3⅓ per cent of aluminum stearate was added and the mixture stirred to form a smooth milky mixture. When the mixture was smooth and free from lumps it was added to the hot rosin mixture while stirring. The heat caused the paraffin and aluminum stearate mixture to jell, giving a product having a working temperature of about 124° to 130° F., with a congealing point of about 120° F. Poultry with a body temperature of 108° F. dipped in the molten wax mixture became covered with a heavy, tough coating which set up quickly without water chilling and with practically no drip.

It is necessary that the wax composition have a melting point below the searing temperature of the birds. This temperature is around 128° to 130° F. for chickens and somewhat lower for turkeys and tender skinned fowl. The wax of the present invention has a working range just below this temperature and yet sets up at about 120° F., which is only a few degrees below the working temperature. These characteristics make the wax composition ideal for poultry picking even in warm weather without spray cooling systems.

Obviously, many modifications and variations of the invention hereinbefore set forth may be made without distinguishing from the spirit and scope thereof, and therefore, only such limitations should be imposed as are indicated in the appended claims.

I claim:

1. A method of depilating carcasses of fowls which comprises coating the carcass with a waxy composition containing mainly rosin and petroleum wax, and a small amount of a water insoluble soap of a metal having a valence in excess of one, and then removing the coating together with the feathers and hair.

2. A method of defeathering poultry carcasses which comprises coating the carcass with a molten waxy composition containing mainly rosin and paraffin, and small amounts of a water insoluble soap of an amphoteric metal and a high melting point vegetable wax, allowing the waxy composition to solidify and then removing the solid coating together with feathers.

3. A method of defeathering poultry carcasses which comprises applying to the carcass a molten coating having waxy characteristics and containing mainly rosin and paraffin wax, and small amounts of a water insoluble soap of a metal having a greater valence than one, a compound selected from the group consisting of candelilla wax and carnauba wax, allowing the coating to cool and removing the coating together with the feathers.

4. A method according to claim 2 in which the soap is aluminum stearate.

5. A method according to claim 2 in which the rosin is a refined gum rosin.

6. A method of defeathering poultry carcasses which comprises applying to the surface of the carcass a molten waxy mixture containing mainly rosin and paraffin and small amounts of a crystallization inhibitor for the rosin, a water insoluble soap of the type of aluminum stearate, a compound selected from the group consisting of candelilla wax and carnauba wax, allowing the waxy coating to solidify and removing the coating together with the feathers.

7. A waxy composition for depilating carcasses of fowls which comprises mainly rosin and petroleum wax, and a small amount of a water insoluble soap of a metal having a valence greater than one, said composition having the property of air cooling to a thick, non-dripping film.

8. A waxy composition for defeathering poultry carcasses which comprises mainly rosin and paraffin and small amounts of a soap of an amphoteric metal and a high melting wax, said composition forming a heavy and non-dripping coating by a single application thereof.

9. A composition according to claim 8 in which the high melting point wax is candelilla wax.

10. A composition according to claim 8 in which the soap is aluminum stearate.

11. A composition according to claim 8 in which the rosin is refined gum rosin.

12. A substantially non-dripping, one-dip composition for defeathering poultry carcasses which comprises mainly rosin and paraffin, and small amounts of a crystallization inhibitor for the rosin, a compound selected from the group consisting of candelilla wax and carnauba wax, and a water insoluble soap of a metal having a valence greater than one.

13. A composition according to claim 12 in which the crystallization inhibitor is gum dammar.

14. A substantially non-dripping waxy composition for defeathering poultry carcasses which comprises mainly rosin and paraffin, the paraffin predominating, and small amounts in about equal proportions of a water insoluble soap of a metal of greater valence than one and at least one compound selected from the group consisting of gum dammar, candelilla wax and carnauba wax.

15. A composition according to claim 12 in which the rosin and paraffin constitute at least about 90 per cent of the mixture.

16. A substantially non-dripping composition for defeathering poultry carcasses which comprises about 35 to 45 per cent of rosin, about 50 to 60 per cent of paraffin and the remainder aluminum stearate and at least one compound selected from the group consisting of gum dammar, candelilla wax and carnauba wax.

17. A composition for defeathering poultry carcasses which comprises about

|  | Pounds |
|---|---|
| Refined rosin | 35–45 |
| Paraffin | 50–65 |
| Aluminum stearate | 1– 3 |
| Candelilla wax | 1– 5 |

18. A composition for defeathering poultry carcasses which comprises about

|  | Pounds |
|---|---|
| Rosin | 35 –45 |
| Paraffin | 50 –65 |
| Gum dammar | 1½– 3½ |
| Aluminum stearate | 1 – 3 |
| Candelilla wax | 1 – 5 |
| Carnauba wax | 0 – 3 |

19. A composition for defeathering poultry carcasses which comprises about

|  | Pounds |
|---|---|
| Rosin | 38 |
| Paraffin | 58 |
| Gum dammar | 2 |
| Aluminum stearate | 2 |
| Candelilla wax | 3 |
| Carnauba wax | 2 |

20. A composition for defeathering poultry carcasses which comprises about

|  | Pounds |
|---|---|
| "Nelio gum" | 40 |
| Paraffin | 58 |
| Aluminum stearate | 2 |
| Candelilla wax | 3 |
| Carnauba wax | 2 |

21. A method according to claim 1 in which the rosin is refined rosin.

22. A method according to claim 1 in which the petroleum wax is paraffin.

23. A method according to claim 1 in which the soap is aluminum stearate.

24. A composition according to claim 7 in which the rosin is refined rosin.

25. A composition according to claim 7 in which the petroleum wax is paraffin.

26. A composition according to claim 7 in which the soap is aluminum stearate.

OSCAR T. BLOOM.